(No Model.)
J. SWAN.
MACHINE FOR MILLING AUGERS.
No. 302,527. Patented July 22, 1884.
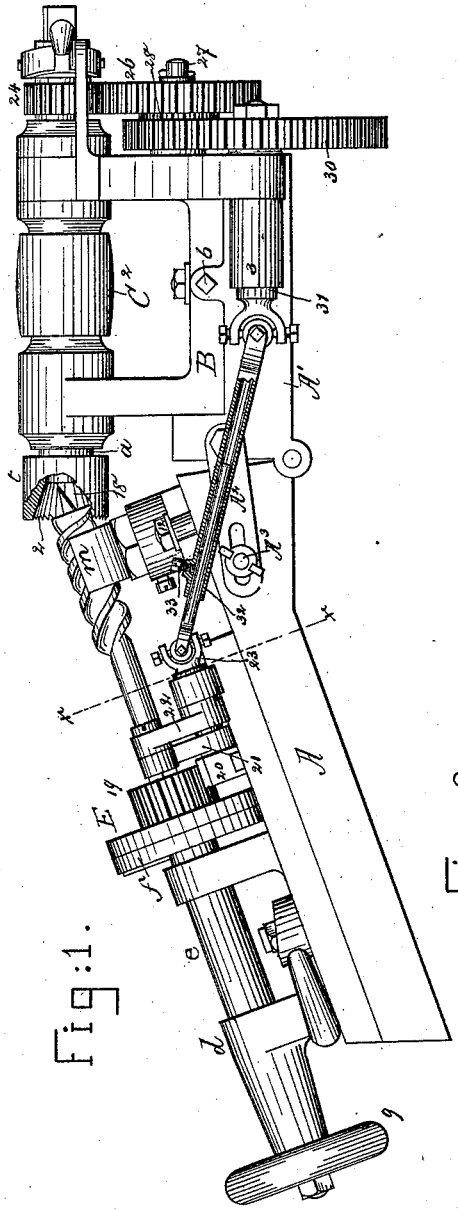
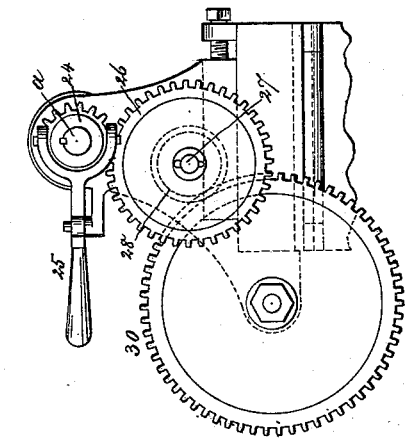
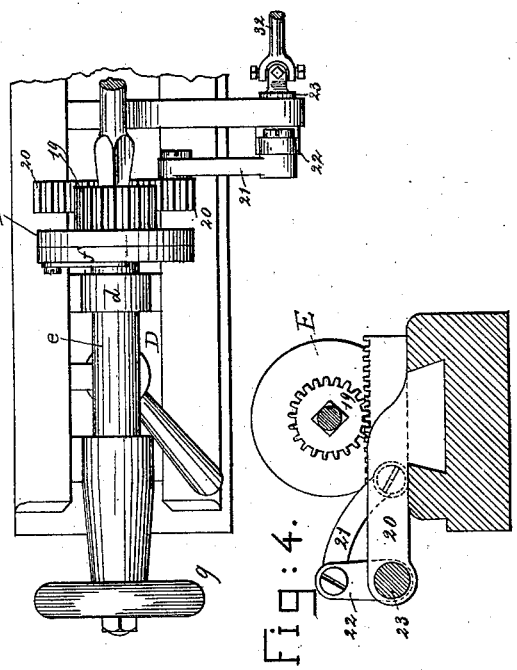
Witnesses.
Arthur Tipperton.
John F. C. Porcinskert.
Inventor.
James Swan.
by Crosby & Gregory attys

UNITED STATES PATENT OFFICE.

JAMES SWAN, OF SEYMOUR, CONNECTICUT.

MACHINE FOR MILLING AUGERS.

SPECIFICATION forming part of Letters Patent No. 302,527, dated July 22, 1884.

Application filed October 6, 1883. (No model.)

*To all whom it may concern:*

Be it known that I, JAMES SWAN, of Seymour, county of New Haven, State of Connecticut, have invented an Improvement in Machines for Forming Augers, of which the following description, in connection with the accompanying drawings, is a specification, like letters on the drawings representing like parts.

In another application filed of even date herewith I have described an apparatus for the manufacture of spur auger-bits; but this present application relates to a modification thereof whereby by change of cutting-tool a common auger or bit having a side lip may have its floor-lip and point milled by the same tool.

Figure 1 is a side elevation, partially broken out, of my improved mechanism for the manufacture of augers and bits. Fig. 2 is a plan or top view of part of the left-hand end of Fig. 1. Fig. 3 is a right-hand end view of Fig. 1; and Fig. 4 is a section on the line $x$ $x$, Fig. 1.

The frame portions A A', placed angularly with relation to each other, link A², head B, arbor $a$, pulley C², carriage D, spindle $e$, disk $f$, chuck or holder E, hand-wheel 8, rest $m$, and means for moving and adjusting the same, are substantially as in my application No. 108,321, filed concurrently with this, to which reference may be had, except as to slight alterations, to be described, in the chuck, to enable it to be rotated first in one and then in the opposite direction.

The tool $t$, herein shown, is cylindrical, and has an annular cutting end, 2, as in the said application, to form the floor-lip for the auger or bit; but the said cylindrical tool, at its inner side, is provided with a series of teeth, 18, (see Fig. 1,) where the tool is broken out, which are inclined outwardly and forwardly from the end of the arbor $a$, in order that the said series of inclined cutting-teeth are enabled to act upon and turn or mill the point 20 of the auger, preparatory to subsequently threading it in the usual way.

In operation the floor-lips will be presented in succession to the action of the floor-lip cutter 2, and thereafter the carriage D will be drawn back far enough to clear the floor-lips from the cutter which formed them, and then while the tool continues in rotation the chuck E (the pawl $f$ being drawn back) is turned or rotated first in one and then in the opposite direction, to enable all parts of the point to be acted upon by the teeth 18. As herein shown, the chuck is provided with a series of teeth, or a gear, 19, which is engaged by a rack-bar, 20, connected by link 21 with a crank, 22, on a shaft, 23, which, by suitable intermediate connections, is actuated from the arbor $a$. The arbor $a$ has splined upon it a gear, 24, which may be moved by lever 25 into or out of gear with the gear 26 on a stud, 27, the said gear 26 having fast to it a smaller gear, 28, which is made to engage with and turn a large gear, 30, fast on a short shaft, 31, on the bearing-sleeve 32. The shafts 23 and 31 have forked ends, which receive between them the ends of a telescopic link adjusted as to its length by the set-screw 33. The ends of the telescopic link are also forked, or the said ends and the ends of the shafts 31 23 are pivoted or jointed together to form gimbal-joints, which permit the relative positions of the said shafts to be changed with relation to each other by the adjustment of the parts A A' and of the carriage D, and yet permit the chuck to be partially rotated whenever the gears 24 and 25 are thrown into engagement.

In the application referred to, the milling-tool has a cutting-edge, 4, within it, which is made as a single annular tooth, and cuts into the base of the screw, near its junction with the floor-lips; but herein the teeth at the interior of the tool $t$ are extended well back into the same to act upon the entire length of and shape the point to be threaded for the production of a leading-screw.

I claim—

1. The rotating arbor and cylindrical tool provided with an annular cutting end, 2, and with an inclined series of teeth, 18, formed within the said tool and extended therein, and shaped to act upon and to turn or mill the point of an auger, combined with a rest for the head, and with a chuck to hold the shank end of the auger while being acted upon by the said tool, and with means to feed the auger or bit up to the cutter, whereby the said auger may have its floor-lip inclined and its point milled, substantially as described.

2. The arbor and cylindrical cutting-tool provided internally with a series of inclined cutting-teeth, 18, and a rest for the head of the auger, combined with a chuck or holder to receive the shank end of the auger, and with means to feed the auger or bit up to the cutter end to impart a rotary reciprocating movement to the chuck and bit or auger, whereby by turning the said chuck and auger the point may be milled to a true taper preparatory to cutting the leading-screw thereon, substantially as described.

3. The arbor and cylindrical cutting-tool provided internally with inclined cutting-teeth 18, and a rest for the head of the auger, and a chuck or holder for its shank end, combined with means to impart a rotary reciprocating movement to the said chuck to turn the auger and enable its point to be milled to a true taper, and with means to move the bit or auger up to the said tool, substantially as described.

In testimony whereof I have signed my name to this specification in the presence of two subscribing witnesses.

JAMES SWAN.

Witnesses:
G. W. GREGORY,
B. J. NOYES.